US011291217B2

(12) United States Patent
Klucik et al.

(10) Patent No.: US 11,291,217 B2
(45) Date of Patent: Apr. 5, 2022

(54) EDIBLE CARAMEL COLOR COMPOSITION

(71) Applicant: The Coca-Cola Company, Atlanta, GA (US)

(72) Inventors: Josef Klucik, Marietta, GA (US); Sangphyo Hong, Glen Ridge, NJ (US)

(73) Assignee: The Coca-Cola Company, Atlanta, GA (US)

( * ) Notice: Subject to any disclaimer, the term of this patent is extended or adjusted under 35 U.S.C. 154(b) by 504 days.

(21) Appl. No.: 16/334,649

(22) PCT Filed: Sep. 20, 2017

(86) PCT No.: PCT/US2017/052444
§ 371 (c)(1),
(2) Date: Mar. 19, 2019

(87) PCT Pub. No.: WO2018/057587
PCT Pub. Date: Mar. 29, 2018

(65) Prior Publication Data
US 2021/0282427 A1 Sep. 16, 2021

Related U.S. Application Data

(60) Provisional application No. 62/396,994, filed on Sep. 20, 2016.

(51) Int. Cl.
A23G 3/32 (2006.01)
A23L 5/40 (2016.01)
A23G 3/36 (2006.01)
A23L 2/58 (2006.01)
A23G 3/34 (2006.01)
A23G 3/42 (2006.01)

(52) U.S. Cl.
CPC .............. *A23G 3/32* (2013.01); *A23G 3/343* (2013.01); *A23G 3/362* (2013.01); *A23G 3/42* (2013.01); *A23L 2/58* (2013.01); *A23L 5/40* (2016.08)

(58) Field of Classification Search
CPC .. A23L 5/40; A23L 2/58; A23G 3/343; A23G 3/362; A23G 3/42
USPC ....................................................... 426/540
See application file for complete search history.

(56) References Cited

U.S. PATENT DOCUMENTS

| 2,767,108 | A | * | 10/1956 | Fetzer | A23G 3/32 |
| | | | | | 127/34 |
| 3,618,588 | A | | 11/1971 | Anwar et al. | |
| 2007/0071850 | A1 | * | 3/2007 | Van Der Ark | A23G 3/346 |
| | | | | | 426/11 |
| 2007/0116817 | A1 | * | 5/2007 | Van Der Ark | A23G 3/346 |
| | | | | | 426/534 |
| 2010/0003383 | A1 | * | 1/2010 | Parker | A23L 5/48 |
| | | | | | 426/262 |
| 2016/0128352 | A1 | * | 5/2016 | Jiang | A23G 3/32 |
| | | | | | 426/540 |
| 2016/0236981 | A1 | | 8/2016 | Burge et al. | |

FOREIGN PATENT DOCUMENTS

| CN | 105925011 | 9/2016 |
| CN | 105925011 | 10/2017 |
| JP | S38-012727 | 7/1963 |

OTHER PUBLICATIONS

International Search Report and the Written Opinion of PCT/US2017/052444 dated Feb. 7, 2018.
Peterson, Martin S., Ph.D., et al., The AVI Publishing Company, Inc., 1978 (5 pp.).
Food and Nutrition Board Institute of Medicine, Food Chemicals Codex, National Academy Press, Jul. 1, 1996 (7 pp.).
JECFA (Joint FAO/WHO Expert Committee on Food Additives), Monograph 1. Combined compendium of food additive specifications. Prepared at 55th JECFA (2000) (12 pp.).
JECFA (Joint FAO/WHO Expert Committee on Food Additives), Monograph 11. Combined compendium of food additive specifications. Prepared at 74th JECFA (2011) (12 pp ).
Kyoritsu Shuppan, Co., Ltd., Encyclopedia Chemica 4, "Color Hue," p. 164, published in 1974 (3 pp.).
English Translation of Submission of Information in JP2019515493.

* cited by examiner

*Primary Examiner* — Jyoti Chawla
(74) *Attorney, Agent, or Firm* — Eversheds Sutherland (US) LLP

(57) ABSTRACT

An edible caramel color composition and method of making the same are disclosed. The method of making an edible caramel color composition includes the step of heating a reaction mixture to form a caramel color composition, wherein the reaction mixture contains: a carbohydrate, and a sulfite compound, in the absence of a caustic compound and in the absence of an ammonium compound.

21 Claims, 6 Drawing Sheets

EDIBLE CARAMEL COLOR COMPOSITION

CROSS-REFERENCE TO RELATED APPLICATIONS

This application is a U.S.C. § 371 national stage application of PCT Patent Application No. PCT/US2017/052444, filed on Sep. 20, 2017, and claims the benefit of priority to U.S. Provisional Patent Application No. 62/396,994, filed on Sep. 20, 2016, each of which is hereby incorporated herein by reference in its entirety.

FIELD OF THE DISCLOSURE

This disclosure relates generally to an edible caramel color compositions and methods of making the same.

BACKGROUND

Caramel color compositions are widely used to impart a desired color to food and beverage products. These compositions typically contain complex mixtures of compounds and are generally produced by heating carbohydrates either alone or in the presence of other ingredients. The caramel colors produced using these processes can have colors ranging from red to red-brown to dark brown or even black.

Although a wide range of color hues can be attained with caramel color compositions, not all compositions can be used across all food and beverage products. For example, some caramel color compositions are suitable for use in low pH food and beverage products, such as carbonated soft drink beverages, whereas other caramel color compositions require higher pH food and beverage products for stability. The cost of producing certain types or caramel color compositions is also an important consideration for many products. Therefore, there remain substantial challenges for producing cost effective caramel color compositions that are suitable in certain foods and beverage products.

SUMMARY

This disclosure provides generally an edible class II caramel color composition suitable for use in low pH food and beverage products, such as soft drink beverages. Methods of making the edible caramel color composition are also provided.

According to one aspect, this disclosure provides a method of making an edible caramel color composition comprising the steps of:
a) heating a reaction mixture comprising a carbohydrate and a sulfite compound in the absence of a caustic compound and in the absence of an ammonium compound, for a sufficient time to form to form a caramel color composition, wherein the edible caramel color composition has a color hue from about 3.8 to about 4.5.
This disclosure also provides the further steps of
b) optionally, cooling the caramel composition/and
c) adding caustic to adjust the pH of the caramel color composition.

Another aspect of the disclosure relates to an edible caramel color composition prepared by a process that comprises the steps set out immediately above. It has been discovered that this process for making an edible caramel color composition, specifically by heating in the absence of caustic to generate the caramel color, followed by adjusting the pH with caustic, provide a caramel color composition which is stable at low pH ranges, has a color hue similar to that of commercially-available "class IV" caramel color composition (as described herein), and therefore is particularly useful for use in carbonated beverages and other low pH food and beverage products.

These and other aspects and embodiments are provided in the detailed description and appended claims, and certain embodiments are illustrated in the figures.

DETAILED DESCRIPTION

Figure 1:
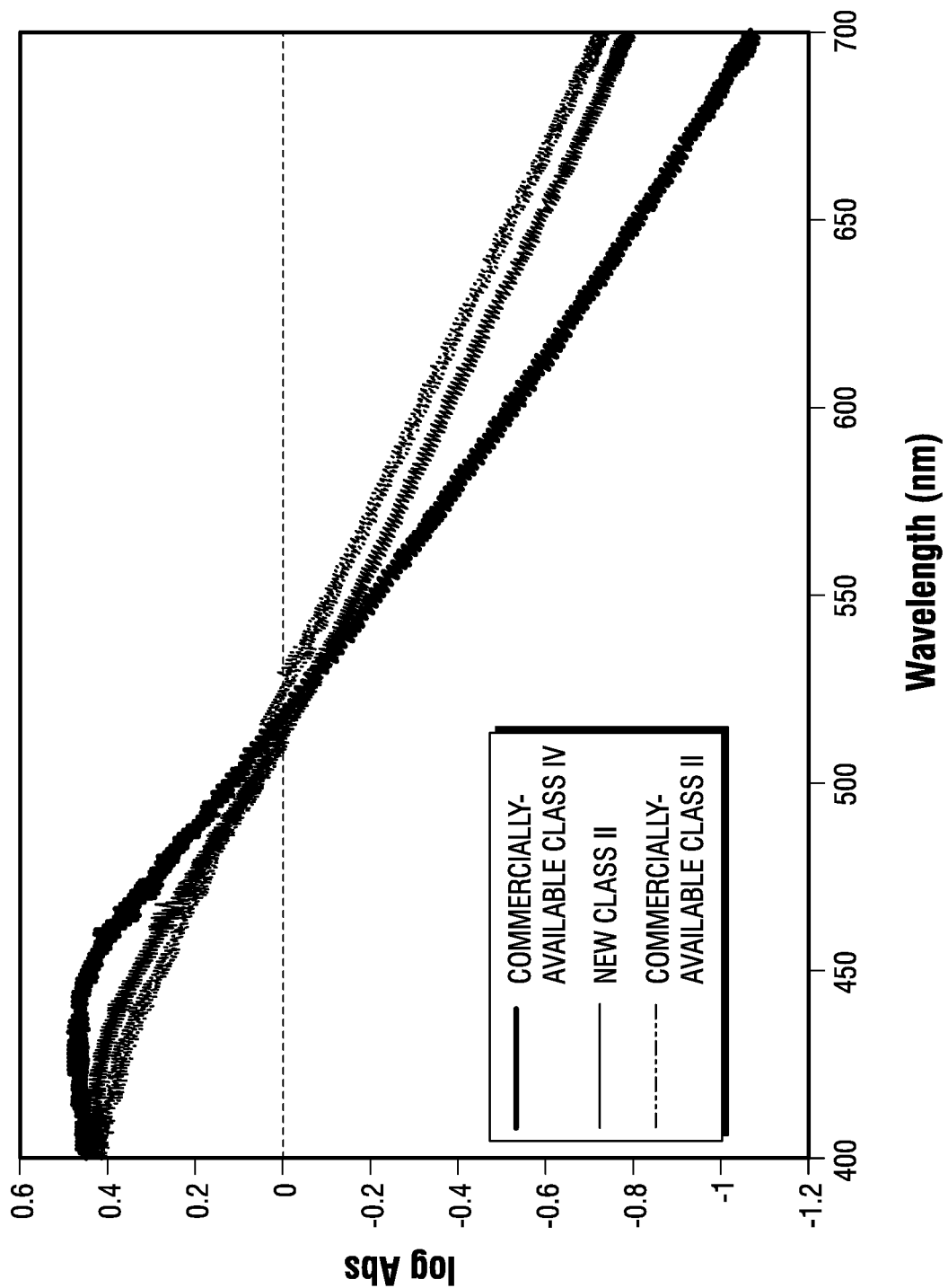
FIG. 1 is graph showing the visible absorption spectra of an edible caramel color composition according to an embodiment of the invention compared to commercially available class II and class IV caramel colors.

One or more specific embodiments and/or aspects of the present disclosure are described herein. Generally, edible caramel color compositions are manufactured by heating carbohydrates consisting of commercially available food-grade nutritive sweeteners either alone or in the presence of food-grade acids, alkalis or salts. The acids, alkali, and/or salts are used as catalysts which give the caramel specific color and functional properties. Edible caramel color compositions made without acids, alkali, and/or salts are generally labeled as "burned sugar", and are used as a flavor with incidental color, rather than as strictly coloring agents. These edible caramel compositions are divided into four general classes, described below.

Class I, also referred to as plain caramel or caustic caramel, is prepared by heating carbohydrates with acids or alkalis, but without the use of any ammonium or sulfite compounds.

Class II, also referred to as caustic sulfite caramel, is prepared by heating carbohydrates with acids or alkalis in the presence of sulfite compounds, but without the use of ammonium compounds. Typically, class II caramel compounds are synthesized using a carbohydrate and a sulfurous acid salt (i.e., sulfite salts of potassium or sodium). The reaction of these chemicals is catalyzed by the addition of a caustic material, such as sodium hydroxide or potassium hydroxide. Generally, class II caramels have a reddish hue and are stable in acid above pHs of about 2.5-3.

Class III, also referred to as ammonia caramel, ammonia process caramel, closed-pan ammonia process caramel, open-pan ammonia process caramel, bakers' caramel, confectioners' caramel, or beer caramel, is prepared by heating carbohydrates with acids or alkalis in the presence of ammonium compounds, but without the use of sulfite compounds.

Class IV, also referred to as sulfite ammonia caramel, is prepared by heating carbohydrates with acids or alkalis in the presence of both sulfite and ammonium compounds. Generally, class IV caramels have a brown or black hue and are generally stable in acid above pHs of about 1.5.

Carbonated soft drink beverages, such as cola-type beverages where caramel color compositions are used typically have a pH of about 1.5 to about 2.5. Because of the low pH of these beverages, at which class II caramel color compositions are typically unstable, class II caramel color compositions have generally been unsuitable for use in carbonated soft drink beverages. Rather, class IV caramel color compositions, which are stable at low pHs, are typically used in carbonated soft drinks and other acidic beverages. Moreover, typical class II caramel color compositions have a reddish hue compared to class IV caramel color compositions, with color hues ranging from about 4.9-7.0 for class II caramel color compositions and from about 3.0-4.5 for class IV caramel color compositions. This reddish hue makes typical class II caramel colors generally unsuitable for use in many carbonated soft drink beverages, such as colas, and other foodstuffs where darker (blacker) color is required and class IV caramel color compositions cannot be used.

Therefore, while class IV caramel color compositions would seem ideal for low pH foods and beverages, class IV caramel color compositions are more costly and time-consuming to produce than commercially-available class II caramel color compositions. For example, class IV caramel color compositions require additional reagents, including ammonia, and often may require additional reaction steps and equipment. Moreover, significant controversy exists in the industry regarding whether a toxicological distinction is warranted between caramels produced commercially using ammonia or ammonium salt (class IV caramel color compositions) and caramel formed in cooked foods or when sucrose is heated. To eliminate the uncertainty surrounding the use of class IV caramel color compositions, it is desirable to form a class II caramel color composition which is stable at low pHs and has a color hue similar to that of commercially-available class IV caramel color compositions.

Embodiments of the present disclosure relate to methods of making an edible, class II caramel color composition with a color hue similar to that of commercially-available class IV caramel color compositions. Further embodiments of the present disclosure relate to an edible, class II caramel color composition with a color hue similar to that of commercially available class IV caramel color compositions which is stable in pHs above about 1.0, for example in pHs from about 1.0 to about 2.5. In some embodiments, the edible class II caramel color composition may be stable in pHs of from about 1.0 to about 2.5, for example about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, or any ranges therebetween. Other embodiments of the present disclosure relate to an edible, class II caramel color composition with a color hue similar to that of commercially available class IV caramel color compositions which is stable in pHs above about 0.1, for example in pHs from about 0.1 to about 2.5. In some embodiments, the edible class II caramel color composition may be stable in pHs of from about 0.1 to about 2.5, for example about 0.1, about 0.2, about 0.3, about 0.4, about 0.5, about 0.6, about 0.7, about 0.8, about 0.9, about 1.0, about 1.1, about 1.2, about 1.3, about 1.4, about 1.5, about 1.6, about 1.7, about 1.8, about 1.9, about 2.0, about 2.1, about 2.2, about 2.3, about 2.4, about 2.5, or any ranges therebetween.

In some embodiments, a method of making an edible caramel color composition can include the steps of: heating a reaction mixture comprising a carbohydrate and a sulfite compound in the absence of a caustic compound and in the absence of an ammonium compound, for a sufficient time to form to form a caramel color composition, wherein the edible caramel color composition has a color hue from about 3.8 to about 4.5. In some embodiments, the edible caramel color composition may have a color hue from about 3.8 to about 4.5, for example about 3.8, about 3.9, about 4.0, about 4.1, about 4.2, about 4.3, about 4.4, about 4.5, or any ranges therebetween. In some embodiments, a method of making an edible caramel color composition can include the steps of: heating a reaction mixture comprising a carbohydrate and a sulfite compound in the absence of a caustic compound and in the absence of an ammonium compound, for a sufficient time to form to form a caramel color composition, wherein the edible caramel color composition has a color hue of less than about 3.8. While these darker edible caramel compositions are not generally useful in the beverage industry, they may be useful across the food industry.

In other embodiments, an edible caramel color composition can be prepared by a process that comprises the steps set out immediately above. The resulting caramel color composition is stable at low pH ranges, has a color hue similar to that of commercially-available "class IV" caramel color compositions, and therefore is particularly useful for use in carbonated beverages and other low pH food and beverage products.

In some embodiments, a method of producing an edible caramel color composition is provided. A sulfite solution can be added to a solution of carbohydrate to produce a reaction mixture having a pH of from about 1 to about 2, for example, a pH of about 1, a pH of about 1.1, a pH of about 1.2, a pH of about 1.3, a pH of about 1.4, a pH of about 1.5, a pH of about 1.6, a pH of about 1.7, a pH of about 1.8, a pH of about 1.9 or a pH of about 2.0 and any ranges therebetween. The sulfite solution may be a liquid or gaseous solution of any suitable sulfur-containing compound, such as sulfur dioxide, potassium sulfites, sodium sulfites and hydrogen sulfites. As would be generally understood by those of skill in the art, an aqueous solution of sulfur dioxide is generally referred to as sulfurous acid, and may contain numerous sulfur oxide species. The solution of carbohydrate may be any suitable carbohydrate which would be known to one of skill in the art, such as fructose, glucose, invert sugar, molasses, lactose, malt syrup, or combinations thereof, typically having a density from about 80 Brix to about 90 Brix, for example about 80 Brix, about 82 Brix, about 84 Brix, about 86 Brix, about 88 Brix, about 90 Brix, and any ranges therebetween. In some embodiments, the sulfite solution may be a sulfurous acid solution, and the sulfurous acid solution may be between about 1% and about 20% sulfur dioxide by weight, for example about 1%, about 5%, about 10%, about 15%, about 20%, or any ranges therebetween. For example, in some embodiments, the sulfurous acid solution may be a commercially-available solution which is about 6% sulfur dioxide by weight.

In some embodiments, the sulfite solution may be a sulfurous acid solution, and the amount of sulfur dioxide added to the reaction mixture in the form of sulfurous acid solution may range from about 1% to about 25% by weight of carbohydrate, for example about 1%, about 5%, about 10%, about 15%, about 20%, about 25%, and any ranges therebetween. In some embodiments, the sulfurous acid solution is added to the solution of carbohydrate in a closed reactor under pressure, for example from about 50 to about 120 psi, for example about 50 psi, about 60 psi, about 70 psi, about 80 psi, about 90 psi, about 100 psi, about 110 psi, about 120 psi, and any ranges therebetween. In some embodiments, the sulfurous acid can be added in at least two portions, at least two time intervals during the reaction, for example half of the sulfurous acid solution may be added to the reaction mixture at the beginning of the reaction, and half of the sulfurous acid solution may be added to the reaction mixture one hour after beginning the reaction. In some embodiments, the sulfurous acid solution may be added to the reaction mixture via high pressure pump.

In some embodiments, the resulting reaction mixture can have a pH from about 1.0 to about 2.0, for example about 1.0, about 1.2, about 1.4, about 1.6, about 1.8, about 2.0, or any ranges therebetween. The reaction mixture is then heated for a time and temperature necessary to form the desired caramel color. As understood by the skilled person, higher temperatures and longer times provide darker and more intense caramel color compositions, and therefore the heating time and temperature can be varied according to the desired properties of the caramel color end product. For example, the resulting reaction mixture can be heated between about 120° C. and about 160° C., for example about 120° C., about 130° C., about 140° C., about 150° C., about 160° C., and any ranges therebetween. The resulting reaction mixture is maintained under pressure and heated for about 2 to about 6 hours, for example about 2 hours, about 2.5 hours, about 3 hours, about 3.5 hours, about 4 hours, about 4.5 hours, about 5 hours, about 5.5 hours, about 6 hours, and any ranges therebetween. For example, in some embodiments, the reaction mixture is heated to 140° C. for 1 hour, 4 hours, or 4.5 hours under pressures from about 70 psi to about 100 psi.

In some embodiments, once the heat is removed from the reactor, reactor vents are opened to release any residual sulfur dioxide. Then, the reaction mixture is generally allowed to cool to about room temperature, and the pH may be adjusted with a caustic agent, such as potassium hydroxide or sodium hydroxide. In some embodiments, the pH is adjusted to about pH 2-4, for example to about pH 2, to about pH 2.5, to about pH 3, to about pH 3.5, to about pH 4, and any ranges therebetween. The resulting edible caramel color composition may then be filtered, such as through membrane filtration, and spray dried. The resulting edible caramel color composition is a class II caramel color composition, but may be stable at low pHs, such as from pH 1.5 to pH 2, and may have a color hue similar to that of commercially available class IV caramel color compositions, for example, from about 3.8 to 4.5, for example, values of 3.8, 3.85, 3.9, 3.95, 4.0, 4.05, 4.1, 4.15, 4.2, 4.25, 4.3, 4.35, 4.4, 4.45, 4.5, and all ranges therebetween. In some embodiments, an edible caramel composition prepared by this process is provided.

FIG. 1 is graph showing the visible absorption spectra of an edible caramel color composition according to an embodiment of the invention compared to commercially available class II and class IV caramel colors. The line marked "Class IV" represents the measured visible absorption spectra for a commercially available class IV caramel color composition. The line marked "Commercially-Available Class II" represents the measured visible absorption spectra for a commercially available class II caramel color composition. The line marked "New Class II" represents the measured visible absorption spectra for an edible caramel color composition according to an embodiment of the present disclosure. As can be seen from this figure, the visible absorption of the edible caramel color composition according to an embodiment of the present disclosure closely resembles the visible absorption spectra of the commercially available class IV caramel color composition, particularly in the wavelengths of about 620 to about 700 nanometers, which are red light.

Figure 2:
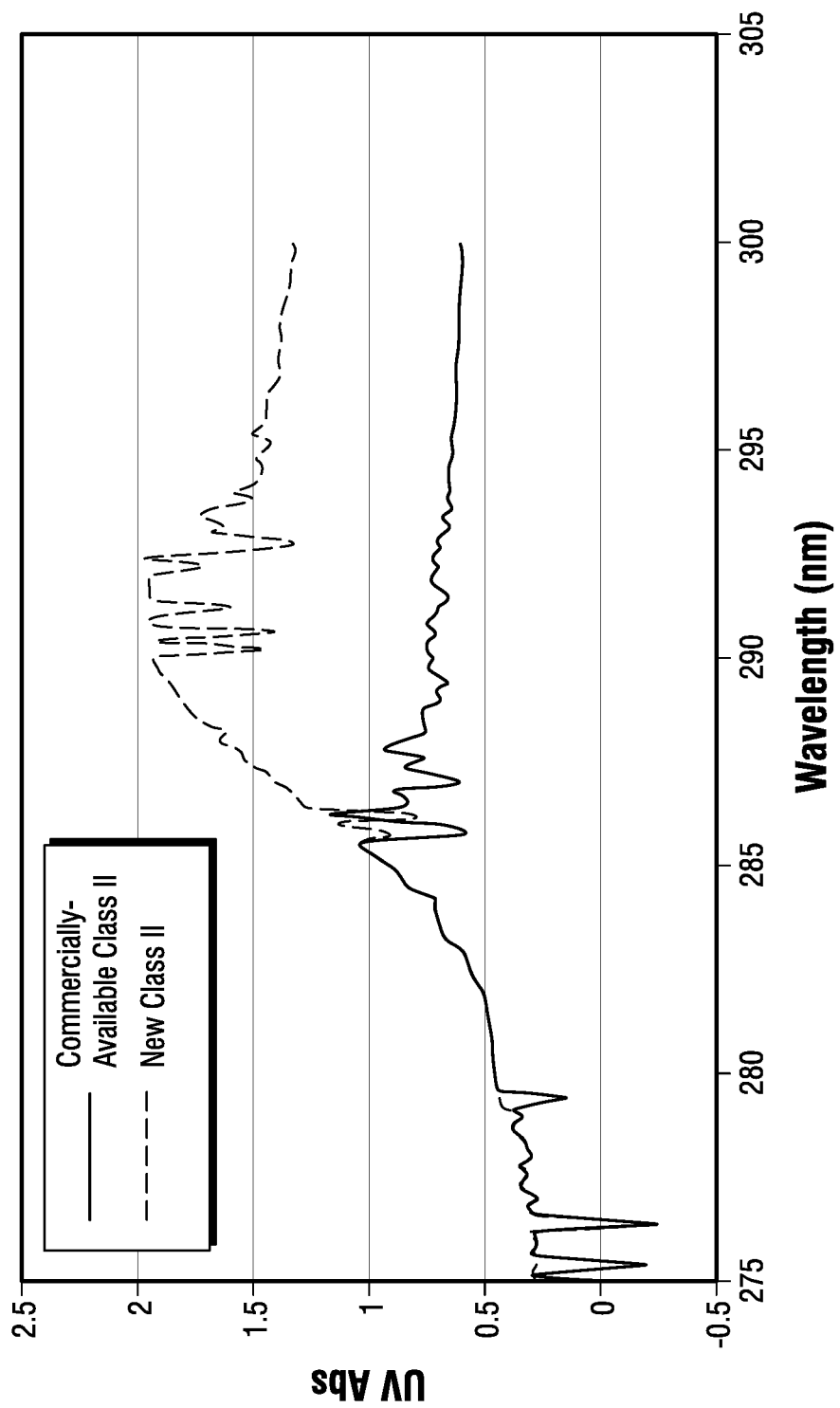
FIG. 2 is a graph showing the UV absorption spectra of an edible caramel color composition according to an embodiment of the invention compared to commercially available class II and class IV caramel colors.

FIG. 2 is a graph showing the UV absorption spectra of an edible caramel color composition according to an embodiment of the invention compared to a commercially-available class II caramel color. The line marked "Commercially-Available Class II" represents the measured UV absorption spectra for a commercially available class II caramel color composition. The line marked "New Class II" represents the measured UV absorption spectra for an edible caramel color composition according to an embodiment of the present disclosure. As can be seen from this figure, the UV absorption of the edible caramel color composition according to an embodiment of the present disclosure differs substantially from the commercially-available class II caramel color composition, particular at wavelengths of greater than 285 nm. While not intending to be bound by theory, the differences in UV absorption between 285-300 nm are thought to evidence the different reaction intermediates, reaction mechanisms, and final products present in a commercially-available class II caramel color compared to those of an edible caramel color composition according to an embodiment of the present disclosure. The differences between these two caramel color compositions is further demonstrated by the differences in the hue indices and acid stability of the two products.

Figure 3:
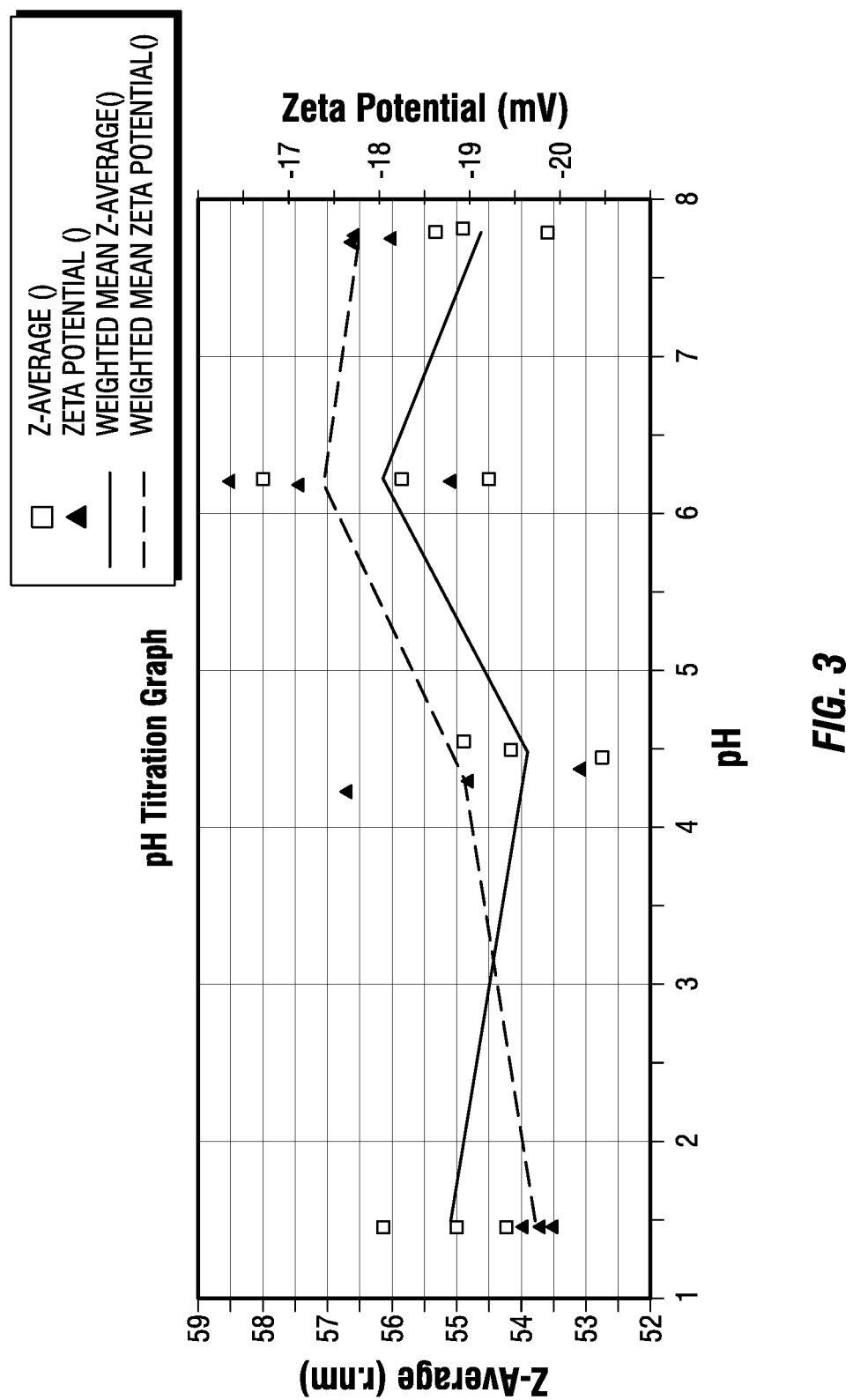
FIG. 3 is a graph showing the z-average particle size and zeta potential of an edible caramel color composition according to an embodiment of the invention at various pH values.

FIG. 3 is a graph showing the z-average particle size and zeta potential of an edible caramel color composition according to an embodiment of the disclosure at various pH values. As can be seen from this graph, both the z-average particle size and zeta potential of the edible caramel color composition according to an embodiment of the disclosure are relatively stable across pH values from about 1.5 to about 8, with all measured values falling between a range of 7 nm and 5 mV, respectively. Notably, this stability at low pH values enables this edible caramel composition to be used in low pHs, such as in carbonated soft drink beverages.

Figure 4:
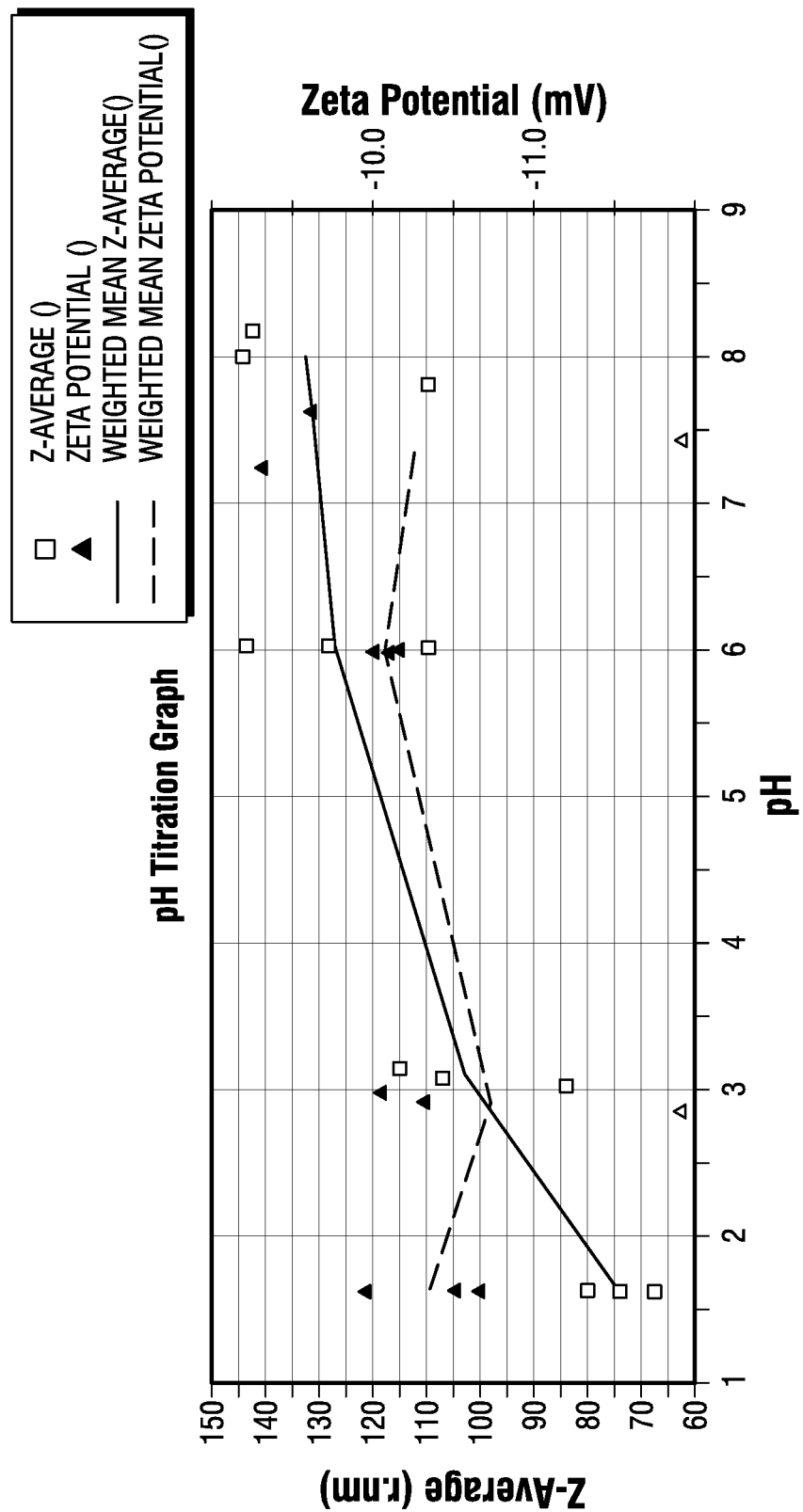
FIG. 4 is a graph showing the z-average particle size and zeta potential of a commercially-available class II caramel color according to an embodiment of the invention at various pH values.

FIG. 4 is a graph showing the z-average particle size and zeta potential of a commercially-available class II caramel color at various pH values. As can be seen from this graph, the z-average particle size decreases precipitously at pHs less than 2, to a z-average particle size about half of the particle size at a pH of 8. Notably, this instability at low pH values prohibits this commercially-available class II caramel color from being useable in low pHs, such as in carbonated soft drink beverages.

Figure 5:
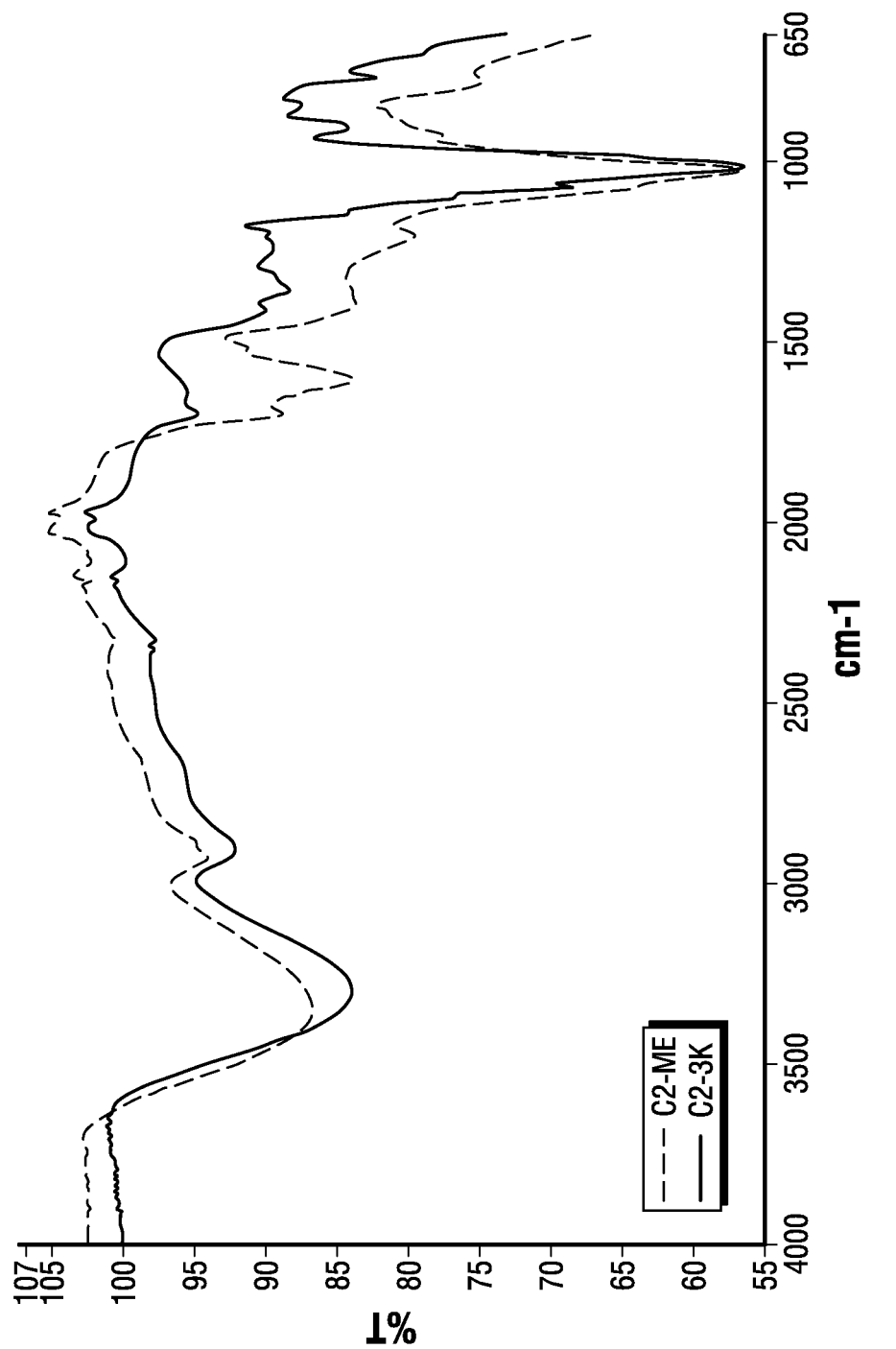
FIG. 5 is a graph showing the IR spectra of an edible caramel color composition according to an embodiment of the invention compared to a commercially-available class II caramel color.

FIG. 5 is a graph showing the IR spectra of an edible caramel color composition according to an embodiment of the invention compared to a commercially-available class II caramel color. The line marked "C2-ME" represents the measured UV absorption spectra for a commercially available class II caramel color composition. The line marked "C2-JK" represents the measured UV absorption spectra for an edible caramel color composition according to an embodiment of the present disclosure. As can be seen from this graph, the chemical structures of the commercially-available class II caramel color composition differs significantly from the chemical structure of the edible caramel color composition according to an embodiment of the present disclosure.

Figure 6:
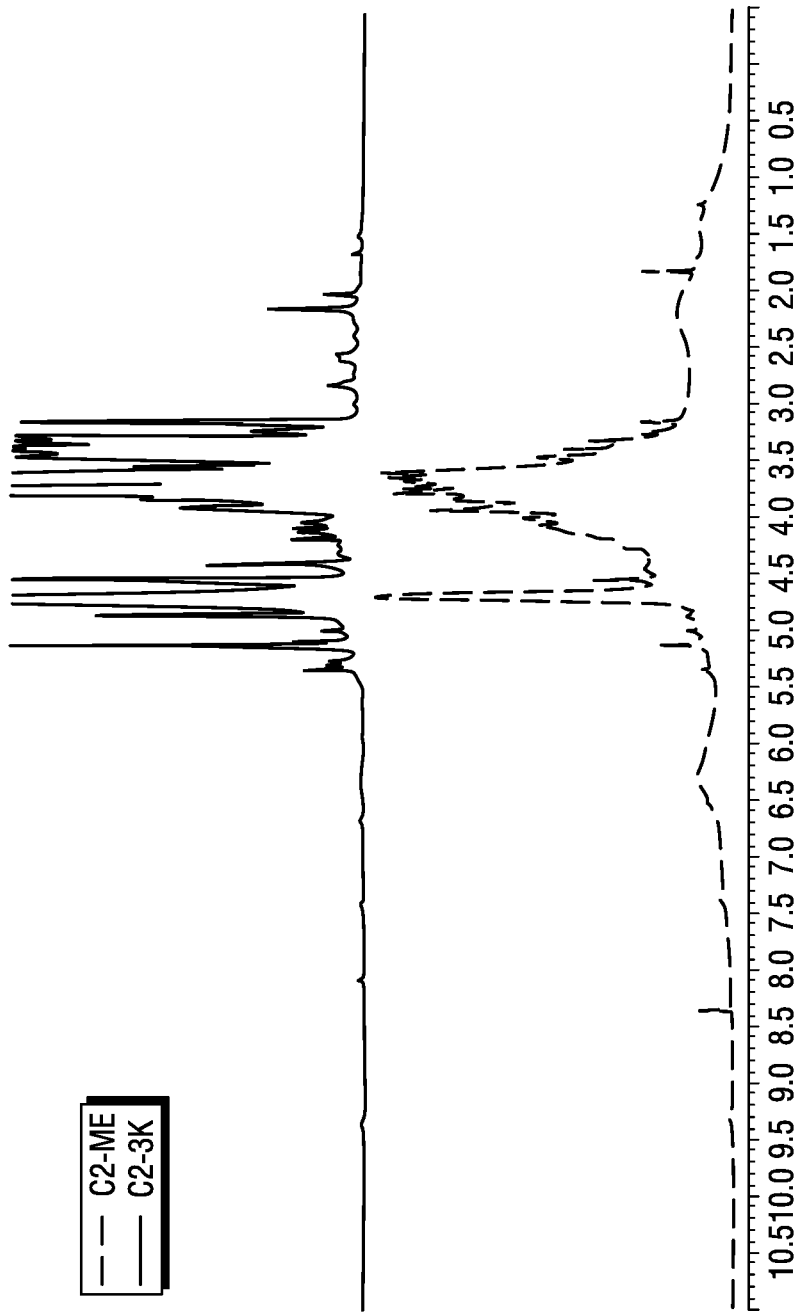
FIG. 6 is a graph showing the Proton NMR spectra of an edible caramel color composition according to an embodiment of the invention compared to a commercially-available class II caramel color.

FIG. 6 presents a $^1$H NMR spectra of an edible caramel color composition according to an embodiment of the invention compared to a commercially-available class II caramel color. The spectrum marked "C2-ME" represents the measured $^1$H NMR spectra for a commercially available class II caramel color composition. The spectrum marked "C2-3K" represents the measured $^1$H NMR spectra for an edible caramel color composition according to an embodiment of the present disclosure. As can be seen from the spectra, the composition of the edible caramel color composition according to an embodiment of the invention is distinct from that of the commercially-available class II caramel color. For example, the $^1$H NMR spectra for an edible caramel color composition according to an embodiment of the present disclosure shows more discrete, distinct peaks than the $^1$H NMR spectra for a commercially-available edible caramel color composition, suggesting that the edible caramel color composition according to an embodiment of the present disclosure is a simpler structure with fewer byproduct moieties than the commercially-available edible caramel color composition.

EXAMPLES

Example 1

A solution of sulfurous acid (2500 grams) which was 6% $SO_2$ by weight was added via a high-pressure pump to 3000 grams of a solution of glucose syrup with a density of 84.2 Brix in a closed reactor. The resultant reaction mixture had a pH of 1.5. The reaction mixture was then heated to 140° C. at a pressure of 100 psi for 4 hours before heat was removed from the reaction. Once heat was removed from the reaction, the vents were opened to remove residual $SO_2$. The pH of the caramel color composition was then measured, and found to be 0.5.

The caramel color composition was then allowed to cool to room temperature, and the pH was adjusted to 2.9 with a solution of 50% KOH. The resulting caramel color composition was filtered through a membrane with a pore size having a molecular weight cutoff (MWCO) of 270 Daltons, and spray dried. The color hue of the caramel color composition was measured to be 4.41. Notably, this color hue is about the same as commercially-available class IV caramel colors, and about 1.5-2 units lower than commercially-available class II caramel colors.

Example 2

A solution of sulfurous acid (1250 grams) which was 6% $SO_2$ by weight was added via a high-pressure pump to 3000 grams of a solution of glucose syrup with a density of 84.2 Brix in a closed reactor. The resultant reaction mixture had a pH of 1.5. The reaction mixture was heated to 140° C. at a pressure of 70 psi for 1 hour. Then, 1250 grams of a solution of sulfurous acid which was 6% $SO_2$ by weight was added via a high pressure pump at a flow rate of 8 ml/min for 150 minutes, while the reaction was at 140° C., and pressure was maintained at 70 psi. After 5 hours, heat was removed from the reaction, and the vents were opened to remove residual $SO_2$. The pH of the caramel color composition was then measured, and found to be 0.9.

The caramel color composition was then allowed to cool to room temperature, and the pH was adjusted to 2.8 with a solution of 50% KOH. The resulting caramel color composition was filtered through a membrane with a pore size having a molecular weight cutoff (MWCO) of 270 Daltons, and spray dried. The color hue of the caramel color composition was measured to be 4.45. Notably, this color hue is about the same as commercially-available class IV caramel colors, and about 1.5-2 units lower than commercially-available class II caramel colors.

Example 3

A solution of 3000 grams of glucose syrup with a density of 84.2 Brix was mixed with 1000 grams of water. This glucose solution was placed in a closed reactor, and 200 grams of $SO_2$ gas was added to the closed reactor. The pH of the resultant reaction mixture was 1.4. This reaction mixture was heated to 140° C. at a pressure of 70 psi for 1 hour. Then, heat was removed from the reaction, and the vents were opened to remove residual $SO_2$. The pH of the caramel color composition was then measured, and found to be 0.7.

The caramel color composition was then allowed to cool to room temperature, and the pH was adjusted to 2.9 with a solution of 50% KOH. The resulting caramel color composition was filtered through a membrane with a pore size having a molecular weight cutoff (MWCO) of 270 Daltons, and spray dried. The color hue of the caramel color composition was measured to be 4.35. Notably, this color hue is about the same as commercially-available class IV caramel colors, and about 1.5-2 units lower than commercially-available class II caramel colors.

Definitions

To define more clearly the terms used herein, the following definitions are provided, and unless otherwise indicated or the context requires otherwise, these definitions are applicable throughout this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

The term "sulfite compound" as used herein refers to a molecular (non-ionic) compound or precursor that contains, or is a source for, an oxide of sulfur (IV) (oxidation state +4), such as, for example, sulfur dioxide and hydrogen sulfite. However, ionic sulfite and bisulfate salts are not encompassed by this definition.

The term "sulfurous acid" as used herein refers generally to the aqueous solutions of $SO_2$ and does not require any specific sulfur oxide species be present. While not intending to be bound by theory, aqueous solutions of $SO_2$ are thought to undergo some oxidation to form some S(VI) species such as $HSO_4^-$ and $SO_4^{2-}$.

Regarding claim transitional terms or phrases, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, when describing a compound or composition "consisting essentially of" is not to be construed as "comprising," but is intended to describe the recited component that includes materials which do not significantly alter composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of, apply only to feature class to which is utilized and it is possible to have different transitional terms or phrases utilized with different features within a claim. For example a method can comprise several recited steps (and other non-recited steps) but utilize a catalyst system preparation consisting of specific steps but utilize a catalyst system comprising recited components and other non-recited components. While compositions and methods are described in terms of "comprising" various components or steps, the compositions and methods can also "consist essentially of" or "consist of" the various components or steps.

The terms "a," "an," and "the" are intended, unless specifically indicated otherwise or the context requires otherwise, to include plural alternatives, e.g., at least one.

When describing a range of measurements such as color hues, pHs, and the like, it is the Applicant's intent to disclose every individual number that such a range could reasonably encompass, for example, every individual number that has at least one more significant figure than in the disclosed end points of the range. As an example, when referring to a color hue of from about 3.8 to about 4.5, Applicant's intent is that the disclosure of this range also discloses and is equivalent to the disclosure of about 3.8, about 3.85, about 3.9, and so on, up to and including about 4.5. Applicant's intent is that these two methods of describing the range are interchangeable. Moreover, when a range of values is disclosed or claimed, Applicant also intends for the disclosure of a range to reflect, and be interchangeable with, disclosing any and all sub-ranges and combinations of sub-ranges encompassed therein. Accordingly, Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application.

Values or ranges may be expressed herein as "about", from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed herein, and that each value is also herein disclosed as "about" that particular value in addition to the value itself. In aspects, "about" can be used to mean within 10% of the recited value, within 5% of the recited value, within 2% of the recited value, or within 1% of the recited value.

Any headings that are employed herein are not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants reserve the right to proviso out any selection, feature, range, element, or aspect, for example, to limit the scope of any claim to account for a prior disclosure of which Applicants may be unaware.

What is claimed is:

1. A method of making an edible caramel color composition comprising the step of:
    heating a reaction mixture under pressure to form a caramel color composition, wherein the reaction mixture comprises:
        a carbohydrate, and
        a sulfite compound,
        in the absence of a caustic compound and in the absence of an ammonium compound, wherein
    the edible caramel color composition has a color hue from about 3.8 to about 4.5.

2. The method of claim 1, wherein the sulfite compound is selected from sulfur dioxide or sulfurous acid.

3. The method of claim 1, wherein the carbohydrate is selected from glucose, fructose, invert sugar, molasses, lactose, or malt syrup.

4. The method of claim 1, wherein the edible caramel color composition is stable at a pH of less than about 1.5.

5. The method of claim 1, wherein the step of heating a reaction mixture under pressure to form a caramel color composition further comprises:
    heating a reaction mixture at a pressure of from about 50 psi to about 150 psi for a time period of from about 1 to about 10 hours.

6. The method of claim 1, wherein the step of heating a reaction mixture under pressure to form a caramel color composition, wherein the reaction mixture further comprises:
    heating a reaction mixture under pressure to a temperature of from about 100° C. to 200° C.

7. The method of claim 1, wherein the caramel color composition has a pH of from about 0.1 to about 3.

8. The method of claim 1, further comprising the steps of cooling the caramel color; and
    adjusting the pH of the caramel color.

9. The method of claim 8, wherein the pH of the caramel color is adjusted by the addition of potassium hydroxide, sodium hydroxide, sodium carbonate, potassium carbonate, hydrogen carbonate, or sodium phosphate.

10. The method of claim 9, further comprising the steps of filtering the caramel color and then spray-drying the caramel color.

11. An edible caramel color composition prepared by a process comprising the steps of:
heating a reaction mixture to form a caramel color composition, wherein the reaction mixture comprises:
a carbohydrate, and
a sulfite compound,
in the absence of a caustic compound and in the absence of an ammonium compound, wherein
the edible caramel color composition has a color hue from about 3.8 to about 4.5.

12. The edible caramel color composition prepared by the process of claim 11, wherein the sulfite compound is selected from sulfur dioxide or sulfurous acid.

13. The edible caramel color composition of claim 11, wherein the step of heating a reaction mixture under pressure to form a caramel color composition further comprises:
heating a reaction mixture at a pressure of from about 50 psi to about 150 psi for a time period of from about 1 to about 10 hours.

14. The edible caramel color composition of claim 11, wherein the step of heating a reaction mixture under pressure to form a caramel color composition, wherein the reaction mixture further comprises:
heating a reaction mixture under pressure to a temperature of from about 100° C. to 200° C.

15. The edible caramel color composition of claim 11, wherein the caramel color composition has a pH of from about 0.1 to about 3.

16. The edible caramel color composition of claim 11, wherein the edible caramel color composition has an average particle size of from about 5 nm to about 60 μm at pHs of from about 1 to about 8.

17. The edible caramel color composition prepared by the process of claim 11, wherein the carbohydrate is selected from glucose, fructose, invert sugar, molasses, lactose, or malt syrup.

18. The edible caramel color composition prepared by the process of claim 11, wherein the process further comprises the steps of
cooling the caramel color; and
adjusting the pH of the caramel color.

19. The edible caramel color composition prepared by the process of claim 18, further comprising the steps of filtering the caramel color and spray-drying or freeze-drying the caramel color.

20. An edible caramel color composition prepared by a process comprising the steps of:
heating a reaction mixture to form a caramel color composition, wherein the reaction mixture comprises:
a carbohydrate, and
a sulfite compound,
in the absence of a caustic compound and in the absence of an ammonium compound, wherein
the edible caramel color composition has a color hue of less than about 3.8.

21. The edible caramel color composition prepared by the process of claim 18, wherein the pH of the caramel color is adjusted by the addition of potassium hydroxide, sodium hydroxide, sodium carbonate, potassium carbonate, hydrogen carbonate, or sodium phosphate.

* * * * *